United States Patent
He et al.

(10) Patent No.: US 9,756,451 B2
(45) Date of Patent: Sep. 5, 2017

(54) TERMINAL APPARATUS AND INFORMATION PROCESSING METHOD

(71) Applicant: LENOVO (BEIJING) CO., LTD., Beijing (CN)

(72) Inventors: Zhiqiang He, Beijing (CN); Chentao Yu, Beijing (CN); Dong Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 310 days.

(21) Appl. No.: 14/460,268

(22) Filed: Aug. 14, 2014

(65) Prior Publication Data

US 2015/0106479 A1 Apr. 16, 2015

(30) Foreign Application Priority Data

Oct. 14, 2013 (CN) .......................... 2013 1 0479254

(51) Int. Cl.
*H04L 29/08* (2006.01)
*H04W 4/00* (2009.01)
(Continued)

(52) U.S. Cl.
CPC .......... *H04W 4/003* (2013.01); *H04L 41/0813* (2013.01); *H04L 41/0816* (2013.01);
(Continued)

(58) Field of Classification Search
CPC ...... H04L 67/10; H04L 41/0803; H04L 41/22
See application file for complete search history.

(56) References Cited

U.S. PATENT DOCUMENTS

| 8,831,902 B2 * | 9/2014 | Wang | H04N 21/25875 |
| | | | 702/119 |
| 2008/0276182 A1 * | 11/2008 | Leow | H04M 1/72525 |
| | | | 715/740 |
| 2012/0151395 A1 * | 6/2012 | Leeb | G06F 8/38 |
| | | | 715/765 |

FOREIGN PATENT DOCUMENTS

| CN | 101163043 | 4/2008 |
| CN | 101175175 | 5/2008 |

OTHER PUBLICATIONS

Chinese Patent Application CN 201310479254.1, Chinese Patent Office, First Office Action dated Jul. 4, 2017; 9 pages.

(Continued)

*Primary Examiner* — Chirag R Patel
(74) *Attorney, Agent, or Firm* — Dentons US LLP; Peter Su

(57) ABSTRACT

There provides an information processing method and a terminal apparatus, and the information processing method is applied in the terminal apparatus, and the terminal apparatus is able to be connected with a remote server. The information processing method includes obtaining a first operation for a first operating environment of a specific user of the terminal apparatus in the first operating environment; responding to the first operation by the first operating environment; transmitting first parameter information of the first operation and second parameter information of the first operating environment in response to the first operation to the remote server; receiving customized configuration information or customized prompt information related to the specific user from the remote server; configuring the first operating environment to provide optimized customized configuration or customized prompt to the specific user based on the customized configuration information or the customized prompt information.

14 Claims, 2 Drawing Sheets

(51) Int. Cl.
*H04L 12/24* (2006.01)
*H04M 1/725* (2006.01)

(52) U.S. Cl.
CPC ........ *H04L 67/10* (2013.01); *H04M 1/72563* (2013.01); *H04W 4/001* (2013.01); *H04M 1/72525* (2013.01)

(56) References Cited

OTHER PUBLICATIONS

English Text Translation of Chinese Patent Application CN 201310479254.1, Chinese Patent Office, First Office Action dated Jul. 4, 2017; 9 pages.
English Translation of Chinese Patent Application CN 101175175 A, Shenzhen Rongchuang Tianxia TE, Chinese Patent Office, Published on May 7, 2008; 13 pages.
English Translation of Chinese Patent Application CA 101163043 A, Huawei Tech Co Ltd, Chinese Patent Office, Published on Apr. 16, 2008; 16 pages.

* cited by examiner

TERMINAL APPARATUS AND INFORMATION PROCESSING METHOD

CROSS REFERENCE TO RELATED APPLICATIONS

This application claims the benefit under 35 U.S.C. §119(a) of Chinese Patent Application No. CN 201310479254.1, filed on 14 Oct. 2013, the disclosure of which is incorporated by reference herein in its entirety.

BACKGROUND

The present invention relates to a terminal apparatus and an information processing method.

With the development of the terminal apparatus such as a smart phone, a tablet computer or a notebook computer, more and more users start to use the terminal apparatus as well as a smart operating system and applications installed in the terminal apparatus. In this case, since the smart operating system and the applications installed in the terminal apparatus generally provide fixed configurations (for example, order of arrangement of menu or fixed hierarchy), it generally can't satisfy habit of usage and personalized requirement of different users at the same time. In addition, since functions of the current smart operation system and the applications are various, many users usually do not know how to use some functions of the smart operating system and the applications.

SUMMARY

To overcome the foregoing conventional technical problems, according to one aspect of the present invention, an information processing method applied in a terminal apparatus is provided capable of connecting with a remote server. The information processing method includes obtaining a first operation for a first operating environment of a specific user of the terminal apparatus in a first operating environment; responding to the first operation by the first operating environment; transmitting first parameter information of the first operation and second parameter information of the first operating environment in response to the first operation to the remote server; receiving customized configuration information or customized prompt information related to the specific user from the remote server, wherein the customized configuration information or the customized prompt information is customized configuration information or customized prompt information for the specific user determined by retrieving an operation history database based on the first parameter information by the remote server, and the operation history database being updated based on the first parameter information and the second parameter information; configuring the first operating environment to provide optimized customized configuration or customized prompt to the specific user based on the customized configuration information or the customized prompt information.

Further, according to one embodiment of the present invention, wherein the first parameter information includes name of the first operating environment, name of operation of the first operation and/or commentary information of the first operation for the first operating environment; and the second parameter information includes first response information of the first operating environment in response to the first operation.

Further, according to one embodiment of the present invention, wherein the first parameter information and the second parameter information for the specific user are stored in a user operation history database corresponding to the specific user at the remote server, and the first parameter information and the second parameter information are managed in the user operation history database, wherein, the remote server manages the first parameter information and the second parameter information based on relevance of the first parameter information and the second parameter information with other first parameter information and second parameter information in the user operation history database.

Further, according to one embodiment of the present invention, wherein during period of generating the customized configuration information related to the specific user, the remote server retrieves parameter information related to the first parameter information in the user operation history database corresponding to the specific user based on the first parameter information, and generates the customized configuration information based on the parameter information related to the first parameter information.

Further, according to one embodiment of the present invention, wherein the first parameter information and the second parameter information are stored in the user operation history database for all of the users and the first parameter information and the second parameter information are managed at the remote server, wherein, the remote server manages the first parameter information and the second parameter information based on the relevance of the first parameter information and the second parameter information with other first parameter information and second parameter information in the user operation history database.

Further, according to one embodiment of the present invention, wherein during the period of generating the customized prompt information related to the specific user, the remote server receives inquiry information related to operation in the first operating environment from the terminal apparatus, and retrieves parameter information related to the inquiry information in the user operation history database based on the inquiry information, and generates the customized prompt information based on the parameter information related to the inquiry information.

Further, according to one embodiment of the present invention, wherein the first operating environment includes an operation system running in the terminal apparatus or programs running on the operation system.

Further, according to another aspect of the invention, there provides a terminal apparatus including a communication unit configured to be connected and communicate with a remote server; a storing unit configured to store program data related to a first operating environment; and a processing unit, wherein the processing unit is configured to obtain a first operation for the first operating environment by a specific user of the terminal apparatus, and the processing unit transmits first parameter information of the first operation and second parameter information of the first operating environment in response to the first operation to the remote server by the communication unit by response to the first operation by the first operating environment, and the processing unit receives customized configuration information or customized prompt information related to the specific user from the remote server by the communication unit, wherein the customized configuration information or the customized prompt information is customized configuration information or customized prompt information for the specific user determined by retrieving an operation history database based on the first parameter information by the remote server, and the operation history database is updated based on the first parameter information and the second parameter information, and the processing unit configures the first operating environment to provide optimized customized configuration or customized prompt to the specific user based on the customized configuration information or the customized prompt information.

Further, according to one embodiment of the present invention, wherein the first parameter information includes name of the first operating environment, name of operation of the first operation and/or commentary information of the first operation for the first operating environment; and the second parameter information includes first response information of the first operating environment in response to the first operation.

Further, according to one embodiment of the present invention, wherein the first parameter information and the second parameter information for the specific user are stored in a user operation history database corresponding to the specific user at the remote server, and the first parameter information and the second parameter information are managed in the user operation history database, wherein, the remote server manages the first parameter information and the second parameter information based on relevance of the first parameter information and the second parameter information with other first parameter information and second parameter information in the user operation history database.

Further, according to one embodiment of the present invention, wherein during period of generating the customized configuration information related to the specific user, the remote server retrieves parameter information related to the first parameter information in the user operation history database corresponding to the specific user based on the first parameter information, and generates the customized configuration information based on the parameter information related to the first parameter information.

Further, according to one embodiment of the present invention, wherein the first parameter information and the second parameter information are stored in a user operation history database for all of the users and the first parameter information and the second parameter information are managed at the remote server, wherein, the remote server manages the first parameter information and the second parameter information based on relevance of the first parameter information and the second parameter information with other first parameter information and second parameter information in the user operation history database.

Further, according to one embodiment of the present invention, wherein, during the period of generating the customized prompt information related to the specific user, the remote server receives inquiry information related to operation in the first operating environment from the terminal apparatus, and retrieves parameter information related to the inquiry information in the user operation history database based on the inquiry information, and generates the customized prompt information based on the parameter information related to the inquiry information.

Further, according to one embodiment of the present invention, wherein the first operating environment includes an operation system running in the terminal apparatus or programs running on the operation system.

BRIEF DESCRIPTION OF THE DRAWINGS

In order to describe the technical solution of the embodiment of the invention more clearly, the accompanying drawings necessary for the description of the embodiments are explained simply. The accompanying drawings in the following description are only exemplary embodiments of the invention.

DETAILED DESCRIPTION

The respective embodiments according to the present invention are described detailed with reference to the accompanying drawings. Here, it is noted that the same reference number are given to constituent parts with substantially same or similar structures and functions, and the repetitive description thereof is omitted.

Hereinafter, the terminal apparatus according to the embodiments of the present invention is described with reference to FIG. 1. Here, the terminal apparatus according to the embodiments of the present invention may be a terminal apparatus such as a smart phone, a tablet computer, a notebook computer. Here, a smart operating system such as Android, Windows and various applications are installed in the terminal apparatus according to the embodiment of the present invention.

Figure 1:
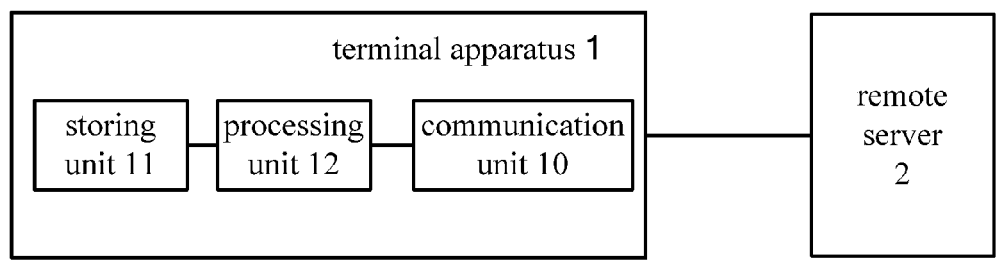
FIG. 1 is a schematic block diagram of the terminal apparatus and the remote server according to the embodiments of the present invention.

As shown in FIG. 1, the terminal apparatus 1 according to the embodiments of the present invention may include a communication unit 10, a storing unit 11, and a processing unit 12.

The communication unit 10 can be implemented by a communication module such as a WIFI module, a 2G/3G module, and can communicate with a remote server 2 such as a cloud server.

The storing unit 11 may be implemented by any non-volatile memory, and may store program data related to a first operating environment and various kinds of user data. Here, the first operating environment may be an operation system running in the terminal apparatus 1 or an operating environment formed by programs running on the operation system (for example, process, routine or the like).

The processing unit 12 may be implemented by any processor or microprocessor. Here, the processing unit 12 may execute predetermined processing based on preset program in the terminal apparatus 1.

According to the embodiments of the present invention, the processing unit 12 may, in the first operating environment, obtain a first operation for the first operating environment of a specific user of the terminal apparatus 1 and respond to the first operation by the first operating environment. Then, the processing unit 12 transmits first parameter information of the first operation and second parameter information of the first operating environment in response to the first operation to the remote server 2 by the communication unit 10. Then, the processing unit 12 receives customized configuration information or customized prompt information related to the specific user from the remote server 2 by the communication unit 10. Here, the customized configuration information or the customized prompt information may be customized configuration information or customized prompt information for the specific user determined by retrieving an operation history database based on the first parameter information by the remote server, and the operation history database can be updated based on the first parameter information and the second parameter information (the detailed content is described in the following). Then, the processing unit 12 configures the first operating environment to provide optimized customized configuration or customized prompt to the specific user based on the customized configuration information or the customized prompt information.

Hereinafter, operation executed by the terminal apparatus 1 and the remote server 2 according to the embodiments of the present invention is described detailed.

According to the embodiments of the present invention, the first operating environment may be the operation system running in the terminal apparatus 1 or the operating environment formed by the programs running on the operation system (for example, the process, the routine or the like). Moreover, in this case, the terminal apparatus 1 can enter the first operating environment by running the system program or the applications related to the first operating environment.

In the first operating environment, the processing unit 12 obtains the first operation for the first operating environment of the specific user of the terminal apparatus 1 and responds to the first operation by the first operating environment. Here, the processing unit 12 is made to correspond the first operation for the first operating environment to the specific user by a manner of associating the specific user and the terminal apparatus 1 in advance (for example, when or after the terminal apparatus 1 is turned on). That is, the first operation is made by the specific user. Here, the first operation may be any operation of the user in the first operating environment, for example, the first operation may be selecting/clicking operation of a certain option on a graphic interface/menu in the first operating environment, or may be specific key-pressing or touching operation which triggers a predetermined function in the first operating environment. Further, the response of the first operating environment to the first operation may be a processing executed to the first operation by the first operating environment. For example, in case that the first operating environment is an Android operation system, and if the first operation is a selecting operation to an option of "system setting" of the user, the response to the first operation by the first operating environment may be displaying the graphic interface/menu of the "system setting". Also, for example, in case that the first operating environment is a Word application, and if the first operation is a selecting operation of "inserting" an option of "form" in the menu, the response to the first operation by the first operating environment may be displaying an interface for inserting a form.

Then, the processing unit 12 transmits the first parameter information of the first operation and the second parameter information of the first operating environment in response to the first operation to the remote server 2 by the communication unit 10. In particular, the first parameter information related to the first operation for the first operating environment by the specific user and the second parameter information of the first operating environment in response to the first operation can be monitored and acquired in real time after associating the terminal apparatus 1 with the specific user by providing an operational record API in the smart operating system or the applications operating as the first operating environment. According to the embodiments of the present invention, the first parameter information may include name of the current first operating environment (for example, the name of the operating system, the name of the applications or the like), the name of operation of the first operation (for example, selection of a specific option in the graphic interface) and/or commentary information of the first operation (if there is any, it is commentary/help information about the first operation provided by the operating system or the applications) for the first operating environment. Further, the second parameter information may include the first response information of the first operating environment responding to the first operation (for example, name of a response processing of the first operating environment and/or commentary information about the response processing for the first operation or the like).

After the processing unit 12 transmits the first parameter information and the second parameter information to the remote server 2 by the communication unit 10, the processing unit 12 waits for and receives the customized configuration information or the customized prompt information related to the specific user from the remote server 2 by the communication unit 10. According to the embodiments of the present invention, the customized configuration information or the customized prompt information may be the customized configuration information or the customized prompt information for the specific user determined by retrieving the operation history database based on the first parameter information by the remote server 2, and the operation history database may be updated based on the first parameter information and the second parameter information.

In particular, according to one embodiment of the present invention, the remote server 2 may be implemented by any cloud-end server. The remote server 2 may store the first parameter information and the second parameter information for the specific user in the user operation history database corresponding to the specific user. Here, the processing unit 12 of the terminal apparatus 1 may transmit association information to the remote server 2 in advance when the terminal apparatus 1 is associated with the specific user, so that the remote server 2 knows that the first parameter information and the second parameter information from the terminal apparatus 1 belong to the specific user.

Hereinafter, the processing of updating the operation history database based on the first parameter information and the second parameter information is described. The remote server 2 may store the received first parameter information and second parameter information in the user operation history database established for the specific user to update the operation history database, and manage the first parameter information and the second parameter information in the user operation history database. In particular, the remote server 2 may manage the first parameter information and the second parameter information based on the relevance of the first parameter information and the second parameter information with other (historical) first parameter information and second parameter information in the user operation history database. For example, the remote server 2 may store the association information of various kinds of operations and response processing in various kinds of operating system and applications in advance in the first operating environment (for example, a next-level operation and a response of each kind of operations or the like), and retrieve the user operation history database to find other (historical) first parameter information and second parameter information associated with the first parameter information and the second parameter information based on information such as the name of the first operating environment, the name of the first operation or the like in the first parameter information and the association information. After retrieving other (historical) first parameter information and second parameter information associated with the first parameter information and the second parameter information, the remote server 2 can associate the first parameter information and the second parameter information with the retrieved other first parameter information and second parameter information in the user history database by a manner of for example establishing or updating a mapping table in the user history database. For example, the first parameter information and the second parameter information of various kinds of corresponding next-level operations and responses, number of occurrence of the first parameter information and the second parameter information representing the various kinds of next-level operations and responses or the like may be stored or updated in corresponding entries in the mapping table for a set of the first parameter information and the second parameter information. Further, other associated entries in the mapping table can be stored or updated for the set of the first parameter information and the second parameter information (as next-level operations of other operations). Further, according to another embodiment of the present invention, the remote server 2 may also study association between the first parameter information and the second parameter information and other first parameter information and second parameter information by taking the first parameter information and the second parameter information as well as other first parameter information and second parameter information in the user history database as training data by any self-study engine of the user. For example, the association of the first parameter information and the second parameter information representing various kinds of operations and responses can be determined through time continuity of various kinds of operations according to lots of training data, and the mapping table is established or updated.

Hereinafter, the operation of generating the customized configuration information by the remote server 2 is described. At the time of generating the customized configuration information related to the specific user, the remote server 2 retrieves all of the parameter information related to the first parameter information in the user operation history database corresponding to the specific user based on the received first parameter information, and generates the customized configuration information based on all of the parameter information related to the first parameter information. Here, the remote server 2 may retrieve the mapping table in the user operation history database based on the first parameter information, to retrieve all of the parameter information associated with the first parameter information to determine the customized configuration information. For example, in the previous example in which the user selects the option of "system setting", the remote server 2 may retrieve all of associated parameter information in the user operation history database (for example, the parameter information related to the next-level operations and responses) based on the first parameter information corresponding to the option of "system setting". In this case, the remote server 2 can determine general operations of the specific user by the mapping table according to all of the retrieved associated parameter information. Here, the remote server 2 can determine the general operations associated with the first operation of the specific user according to number of occurrence of all of the related parameter information in a manner of ordering from more to less, and generate the customized configuration information based on the general operations associated with the first operation. Here, the customized configuration information includes information of the general operations associated with the first operation about the specific user (for example, the name of the operation or the like). For example, the customized configuration information may include information of at least one (for example, three to five) associated most general operations.

After the processing unit 12 receives the customized configuration information related to the specific user, the processing unit 12 may configure the first operating environment to provide optimized customized configuration to the specific user based on the customized configuration information. Here, the processing unit 12 of the terminal apparatus 1 can decide the operation likely to be executed next according to the information of the general operations associated with the first operation of the specific user included in the customized configuration information, and configure the first operating environment according to the operations decided to be executed likely. For example, in the previous example in which the user selects the option of "system setting" of the operating system, if the processing unit 12 decides that the user always carry out a selection operation of options of "subject", "WLAN", "wallpaper" or the like after selecting the option of "system setting", the processing unit 12 may configure the graphic interface of the operating system, so that after the user selects the option of "system setting", the options of "subject", "WLAN", "wallpaper" or the like are made at the uppermost side of a setting interface of the display system at the time of displaying a system setting interface after response by the first operating environment, to facilitate usage of the user. Also for example, when the user selects a virtual joystick as a default manipulation mode when a certain racing game is running, the processing unit 12 may set the virtual joystick as the default manipulation mode directly based on the customized configuration information from the remote server when the user enters the racing game again after the terminal apparatus 1 resets.

By the above-described configuration, since the remote server 2 receives the first parameter information and the second parameter information related to the various kinds of operations and responses of the specific user continually, the user operation history database is updated with the first parameter information and the second parameter information, and the customized configuration information is generated by retrieving the user operation history database with the first parameter information. In this case, along with the specific user uses the terminal apparatus 1 continually, the parameter information in the user operation history database would be sufficient to reflect daily operations of the specific user accurately, so that the generated customized configuration information is compliant with habit of the usage of the specific user more and more, thereby usage experience of the user is improved. Further, it needs to note that since samples are insufficient at the time of initial usage of the specific user, unexpected result may be generated. Therefore, according to one embodiment of the present invention, when the number of the entries of the parameter information in the remote server 2 is less than a preset threshold (for example, 100), the remote server 2 may transmit the customized configuration information presenting no modification to be made to the terminal apparatus 1.

The operations of the terminal apparatus 1 and the remote server 2 are described in the above; however, the present invention is not limited thereto. Hereinafter, the operation of generating the customized prompt information by the remote server 2 is described. For example, according to another embodiment of the present invention, the remote server 2 can store the first parameter information and the second parameter information in the user operation history database, and manage the first parameter information and the second parameter information for all users. In addition, the remote server 2 can manage the first parameter information and the second parameter information based on relevance of the first parameter information and the second parameter information with other first parameter information and second parameter information in the user operation history database.

In particular, being different from the previous embodiment in which corresponding user operation history database is established or updated for the specific user, the remote server 2 can update separated user operation history database for the first parameter information and the second parameter information of all users.

In this case, the remote server 2 may store the received first parameter information and second parameter information of the specific user in a separated user operation history database to update the user operation history database, and manage the first parameter information and the second parameter information in the user operation history database. Similarly, the remote server 2 may manage the first parameter information and the second parameter information based on the relevance of the first parameter information and the second parameter information with other (historical) first parameter information and second parameter information in the user operation history database. For example, the remote server 2 can manage the first parameter information and the second parameter information with an operation chain, i.e., relevance of a sequence of operations constituted by successive sequences of operations of respective levels in the first operating environment. Here, the remote server 2 may study the association between the first parameter information and the second parameter information and the other first parameter information and second parameter information by taking the first parameter information and the second parameter information and other first parameter information and second parameter information in the user history database as training data. For example, the association of the first parameter information and the second parameter information representing various kinds of operations and responses may be determined by the time continuity of the various kinds of operations of each user in the first operating environment according to lots of training data, so as to achieve the purpose of managing the first parameter information and the second parameter information with the association of the operation chain. Similar to the previous description, the first parameter information and the second parameter information or the like corresponding to various kinds of upper level and lower level operations and responses may be stored or updated in the corresponding entries of the mapping table for the specific first parameter information and second parameter information. In this case, the parameter information related to the entire operation chain can be acquired by the first parameter information of a certain operation in the operation chain.

In this case, at the time of generating the customized prompt information related to the specific user, the remote server 2 may receive inquiry information related to the operations in the first operating environment from the terminal apparatus 1. In this case, the remote server 2 may retrieve the parameter information related to the inquiry information in the user operation history database based on the inquiry information. In particular, the remote server 2 can use the inquiry information as a search key to inquiry the mapping table in the user history database, and obtain the entry which is matched with the inquiry information and thereby obtain the parameter information related to the inquiry information (for example, the parameter information about the entire operation chain). In this case, the remote server 2 may generate the customized prompt information (prompt of operation) based on the parameter information related to the inquiry information (the parameter information about the entire operation chain). For example, in case that the specific user wants to use changing proxy server in Chrome, the inquiry information may be "changing proxy server". The remote server 2 can obtain an entry, which is matched with the "changing proxy server" based on the inquiry information, thereby obtain the parameter information related to the "changing proxy server" (the parameter information about the entire operation chain). In this case, the remote server 2 can generate the customized prompt information according to the first operation in the corresponding entire operation chain and the operation chain of the operation corresponding to the "changing proxy server", and in this example it may be "setting→advanced settings→changing proxy server".

After the processing unit 12 receives the customized prompt information related to the specific user, the processing unit 12 may provide the optimized customized prompt to the specific user based on the customized prompt information. Here, the processing unit 12 of the terminal apparatus 1 may display prompt information to the specific user according to the customized prompt information, for example, in the above example, the displayed prompt may be "setting→advanced settings→changing proxy server".

By the above-described configuration, since the remote server 2 receives the first parameter information and the second parameter information related to the various kinds of operations and responses from a plurality of users continually, the user operation history database is updated with the first parameter information and the second parameter information. In this case, even if the specific user does not know method of using a certain function or option in the first operating environment, since other user has executed similar operation, the customized prompt information can be generated by retrieving the user operation history database with the inquiry information, thereby the user feels convenient, and it can implement a more powerful help function.

The operation executed by the terminal apparatus 1 and the remote server 2 according to the embodiments of the present invention is described with respect to some examples of the first operating environment in the above. However, the present invention does not limit to the above-described examples, the operation executed by the terminal apparatus 1 and the remote server 2 according to the embodiments of the present invention can be applied to any operating systems and/or applications which can function as the first operating environment, and the operation executed by the terminal apparatus 1 and the remote server 2 according to the embodiments of the present invention is identical or similar to that in the previous embodiment, therefore it is no longer described here.

Hereinafter, the information processing method according to the embodiments of the present invention is described with reference to FIG. 2. Here, the information processing method in FIG. 2 can be applied to the terminal apparatus 1 shown in FIG. 1. Here, the terminal apparatus 1 may be connected with the remote server 2.

Figure 2:
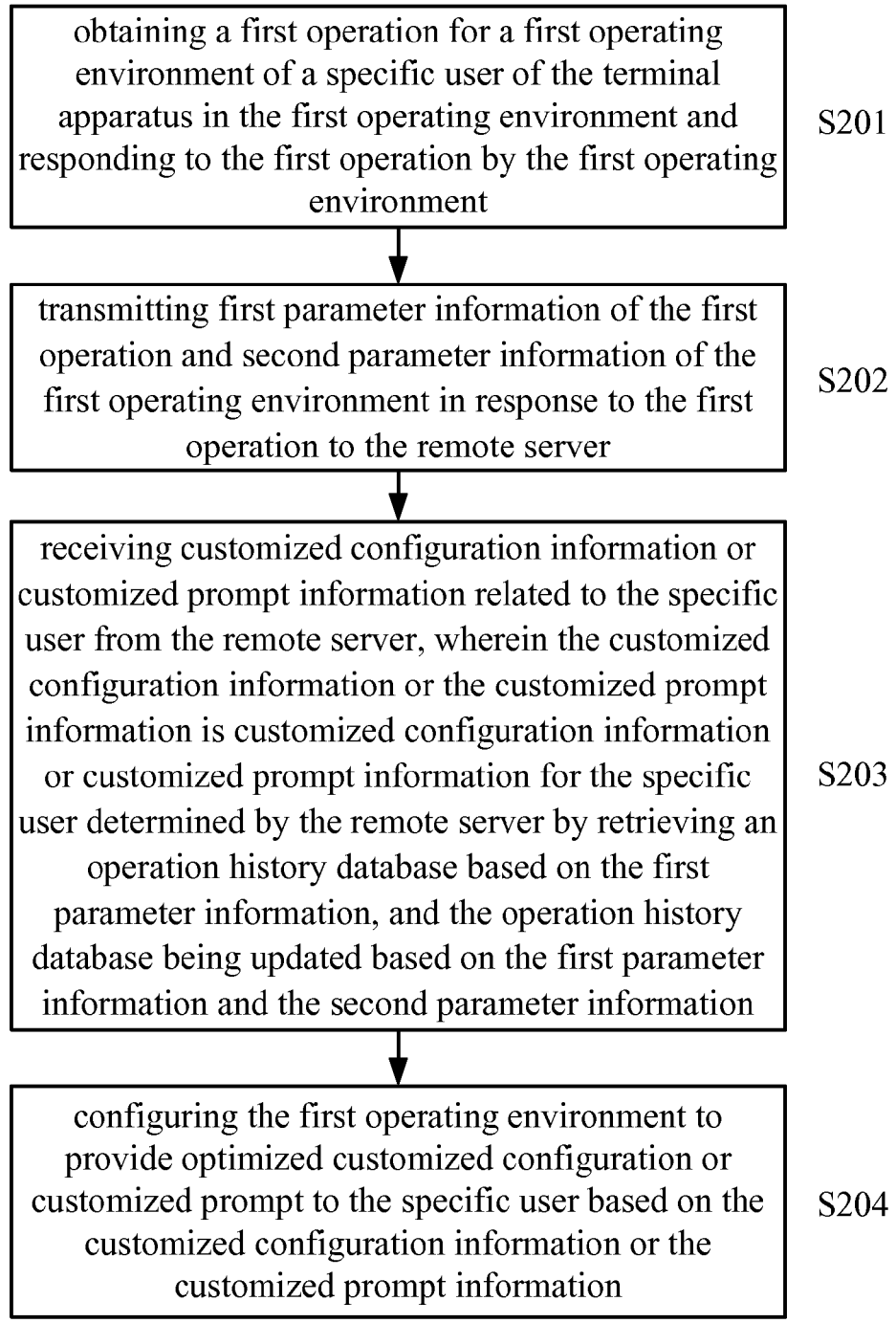
FIG. 2 is a schematic flow diagram illustrating the information processing method according to the embodiments of the present invention.

As shown in FIG. 2, in step S201, in the first operating environment, the first operation for the first operating environment of the specific user of the terminal apparatus 1 is obtained and the first operating environment responds to the first operation.

In particular, similar to the description of FIG. 1, the first operating environment may be the operation system running on the terminal apparatus 1 or the operating environment formed by the programs running on the operation system (for example, the process, the routine or the like). In addition, in this case, the terminal apparatus 1 can enter the first operating environment by running the system program or the application related to the first operating environment. In the first operating environment, the processing unit 12 obtains the first operation for the first operating environment of the specific user of the terminal apparatus 1 and responds to the first operation by the first operating environment. Here, the processing unit 12 is made to correspond the first operation for the first operating environment to the specific user by the manner of associating the specific user and the terminal apparatus 1 in advance, that is, the first operation is made by the specific user. Here, the first operation may be any operation of the user in the first operating environment, for example, the first operation may be the selecting/clicking operation of a certain option on the graphic interface/menu in the first operating environment, or may be the specific key-pressing or touching operation which triggers the predetermined function in the first operating environment. Further, the response to the first operation by the first operating environment may be the processing executed to the first operation in the first operating environment.

In step S202, the first parameter information of the first operation and the second parameter information of the first operating environment in response to the first operation are transmitted to the remote server.

In particular, the processing unit 12 transmits the first parameter information of the first operation and the second parameter information of the first operating environment in response to the first operation to the remote server 2 by the communication unit 10. According to the embodiments of the present invention, the first parameter information related to the first operation for the first operating environment by the specific user and the second parameter information of the first operating environment in response to the first operation can be monitored and acquired in real time after associating the terminal apparatus 1 with the specific user by providing the operational record API in the smart operating system or the applications operating as the first operating environment. According to the embodiments of the present invention, the first parameter information may include the name of the current first operating environment (for example, the name of the operating system, the name of the applications or the like), the name of operation of the first operation (for example, selection of the specific option of the graphic interface) and/or commentary information of the first operation (if there is any, it is commentary/help information about the first operation provided by the operating system or the applications) for the first operating environment. Further, the second parameter information may include the first response information of the first operating environment in response to the first operation (for example, the name of the response processing of the first operating environment to the first operation and/or commentary information about the response processing or the like).

In step S203, the customized configuration information or the customized prompt information related to the specific user are received from the remote server. Here, the customized configuration information or the customized prompt information may be the customized configuration information or the customized prompt information for the specific user determined by retrieving the operation history database based on the first parameter information by the remote server, and the operation history database may be updated based on the first parameter information and the second parameter information.

In particular, after the processing unit 12 transmits the first parameter information and the second parameter information to the remote server 2 by the communication unit 10, the processing unit 12 waits for and receives the customized configuration information or the customized prompt information related to the specific user from the remote server 2 by the communication unit 10. According to the embodiments of the present invention, the customized configuration information or the customized prompt information may be the customized configuration information or the customized prompt information for the specific user determined by retrieving the operation history database based on the first parameter information by the remote server 2, and the operation history database may be updated based on the first parameter information and the second parameter information.

For example, according to one embodiment of the present invention, the remote server 2 may store the first parameter information and the second parameter information for the specific user in the user operation history database corresponding to the specific user. Here, the processing unit 12 of the terminal apparatus 1 transmits the association information to the remote server 2 in advance when the terminal apparatus 1 is associated with the specific user, so that the remote server 2 knows that the first parameter information and the second parameter information from the terminal apparatus 1 belong to the specific user. Then, the remote server 2 stores the received first parameter information and second parameter information in the user operation history database established for the specific user to update the operation history database, and manages the first parameter information and the second parameter information in the user operation history database. In particular, the remote server 2 manages the first parameter information and the second parameter information based on the relevance of the first parameter information and the second parameter information with other (historical) first parameter information and second parameter information in the user operation history database. For example, the remote server 2 may store the association information of the various kinds of processing of operations and responses in the various kinds of operating systems and applications in the first operating environment (for example, the next-level operations and responses of each kind of operation or the like) in advance, and retrieve the user operation history database to find other (historical) first parameter information and second parameter information associated with the first parameter information and the second parameter information based on the information such as the name of the first operating environment, the name of the first operation or the like in the first parameter information and the association information. After retrieving other (historical) first parameter information and second parameter information associated with the first parameter information and the second parameter information, the remote server 2 can associate the first parameter information and the second parameter information with the retrieved other first parameter information and second parameter information in the user history database by the manner of for example establishing or updating the mapping table in the user history database. For example, the first parameter information and the second parameter information of the various kinds of corresponding next-level operations and responses, number of occurrence of the first parameter information and the second parameter information representing the various kinds of next-level operations and responses or the like can be stored or updated in the corresponding entries in the mapping table for the set of the first parameter information and the second parameter information. Further, other associated entries in the mapping table can be stored or updated for the set of the first parameter information and the second parameter information (as next-level operations of other operation). Further, according to another embodiment of the present invention, the remote server 2 may also study the association between the first parameter information and the second parameter information and other first parameter information and second parameter information by taking the first parameter information and the second parameter information as well as other first parameter information and second parameter information in the user history database as training data by using any self-study engine of the user. For example, the association of the first parameter information and the second parameter information representing the various kinds of operations and responses can be determined through the time continuity of the various kinds of operations according to lots of training data, and the mapping table is established or updated.

In this embodiment, at the time of generating the customized configuration information related to the specific user, the remote server 2 retrieves all of the parameter information related to the first parameter information in the user operation history database corresponding to the specific user based on the received first parameter information, and generates the customized configuration information based on all of the parameter information related to the first parameter information. Here, the remote server 2 may retrieve the mapping table in the user operation history database based on the first parameter information, to retrieve all of the parameter information associated with the first parameter information to determine the customized configuration information. For example, in the previous example in which the user selects the option of "system setting", the remote server 2 may retrieve all of the associated parameter information in the user operation history database (for example, the parameter information related to the next-level operations and responses) based on the first parameter information corresponding to the option of "system setting". In this case, the remote server 2 can determine the general operations of the specific user by the mapping table according to all of the retrieved associated parameter information. Here, the remote server 2 can determine the general operation associated with the first operation of the specific user according to number of occurrence of all of the related parameter information in the manner of ordering from more to less, and generate the customized configuration information based on the general operation associated with the first operation. Here, the customized configuration information includes information of the general operation associated with the first operation about the specific user (for example, the name of the operation or the like). For example, the customized configuration information may include information of at least one (for example, three to five) associated most general operations.

Further, according to another embodiment of the present invention, the remote server 2 may also store the first parameter information and the second parameter information in the user operation history database, and manage the first parameter information and the second parameter information for all users. Moreover, the remote server 2 may manage the first parameter information and the second parameter information based on the relevance of the first parameter information and the second parameter information with other first parameter information and second parameter information in the user operation history database. In particular, the remote server 2 may update separated user operation history databases for the first parameter information and the second parameter information of all users. In this embodiment, the remote server 2 stores the received first parameter information and second parameter information of specific user in the separated user operation history databases to update the user operation history databases, and manages the first parameter information and the second parameter information in the user operation history databases. Similarly, the remote server 2 manages the first parameter information and the second parameter information based on the relevance of the first parameter information and the second parameter information with other (historical) first parameter information and second parameter information in the user operation history database. For example, the remote server 2 may manage the first parameter information and the second parameter information with an operation chain, that is, relevance of a sequence of operations constituted by a successive sequence of operations of respective levels in the first operating environment. Here, the remote server 2 studies association between the first parameter information and the second parameter information and the other first parameter information and second parameter information by taking the first parameter information and the second parameter information and other first parameter information and second parameter information in the user operation history database as training data. For example, the association of the first parameter information and the second parameter information representing various kinds of operations and responses may be determined by time continuity of the various kinds of operations of each user in the first operating environment according to lots of training data, so as to achieve the purpose of managing the first parameter information and the second parameter information with the association of the operation chain. Similar to previous description, the first parameter information and the second parameter information or the like corresponding to the various kinds of operations and responses of upper levels and lower levels may be stored or updated in the corresponding entries of the mapping table for specific first parameter information and second parameter information. In this case, the parameter information related to an entire operation chain can be acquired by the first parameter information of a certain operation in the operation chain.

In this embodiment, at the time of generating the customized prompt information related to the specific user, the remote server 2 may receive inquiry information related to the operation in the first operating environment from the terminal apparatus 1. In this case, the remote server 2 retrieves the parameter information related to the inquiry information in the user operation history database based on the inquiry information. In particular, the remote server 2 can use the inquiry information as a search key to inquiry the mapping table in the user operation history database, and obtain an entry which is matched with the inquiry information and thereby obtain the parameter information related to the inquiry information (for example, the parameter information about the entire operation chain). At this time, the remote server 2 generates the customized prompt information (operation prompt) based on the parameter information related to the inquiry information (the parameter information about the entire operation chain). For example, in case that the specific user wants to use the changing proxy server in the Chrome, the inquiry information may be "changing proxy server". The remote server 2 can obtain the entry, which is matched with "changing proxy server" based on the inquiry information, thereby obtain the parameter information related to "changing proxy server" (the parameter information about the entire operation chain). In this case, the remote server 2 can generate the customized prompt information according to the first operation in the corresponding entire operation chain and the operation chain of the operation corresponding to "changing proxy server", and in this example it may be "setting→advanced settings→changing proxy server".

Then, in step S204, the first operating environment is configured to provide optimized customized configuration or customized prompt to the specific user based on the customized configuration information or the customized prompt information.

In particular, according to one embodiment of the present invention, after the processing unit 12 receives the customized configuration information related to the specific user, the processing unit 12 may configure the first operating environment to provide optimized customized configuration to the specific user based on the customized configuration information. Here, the processing unit 12 of the terminal apparatus 1 can decide the operation to be carried out next likely according to the information of the general operation associated with the first operation of the specific user included in the customized configuration information, and configure the first operating environment according to the operation decided to be carried out next likely. For example, in the previous example in which the user selects the option of "system setting" of the operating system, if the processing unit 12 decides that the user always carry out selection operation of options of "subject", "WLAN", "wallpaper" or the like after selecting the option of "system setting", the processing unit 12 may configure the graphic interface of the operating system, so that after the user selects the option of "system setting", the options of "subject", "WLAN", "wallpaper" or the like are made at the uppermost side of setting interface of the display system when the display system sets interface after response of the first operating environment, to facilitate the usage of the user. Also for example, when the user select virtual joystick as a default manipulation mode when a certain racing game is running, the processing unit 12 may set the virtual joystick as the default manipulation mode directly based on the customized configuration information from the remote server when the user enters the racing game again after the terminal apparatus 1 resets.

Further, according to another embodiment of the present invention, after the processing unit 12 receives the customized prompt information related to the specific user, the processing unit 12 may provide optimized customized configuration to the specific user based on the customized prompt information. For example, the processing unit 12 of the terminal apparatus 1 may display prompt information to the specific user according to the customized prompt information, for example, in the above example, the displayed prompt may be "setting→advanced settings→changing proxy server".

A plurality of embodiments of the present invention are described above, however, it needs to note that the embodiments of the present invention can be implemented by using entire hardware implementation, entire software implementation or mode including combination of hardware and software. For example, in some embodiments, the embodiments of the present invention can be implemented by a mode of installing software in the terminal apparatus and the remote server, which includes (but be not limited to) firmware, built-in software, Microcode or the like. Further, the present invention can adopt a form of a computer program product used by a computer or any command executive system to carry on the processing method according to the embodiments of the present invention, and the computer program product is stored in a computer readable medium. The example of the computer readable medium includes a semiconductor or solid-state memory, a magnetic tape, a removable computer disk, a random access memory (RAM), a read-only memory (ROM), a hard disk and an optical disk or the like.

Each embodiment of the present invention is described detailed above. However, those skilled in the art should understand, these embodiments can be made various modifications, combinations or sub-combinations without departing from the principle and spirit of the present invention, and such modifications or the like should fall into the range of the present invention.

What is claimed is:

1. An information processing method applied in a terminal apparatus, which is able to be connected with a remote server, the information processing method comprising:
   obtaining a first operation for a first operating environment of a specific user of the terminal apparatus in the first operating environment;
   responding to the first operation by the first operating environment;
   transmitting first parameter information of the first operation and second parameter information of the first operating environment in response to the first operation to the remote server;
   receiving customized configuration information or customized prompt information related to the specific user from the remote server, wherein the customized configuration information or the customized prompt information is customized configuration information or customized prompt information for the specific user determined by the remote server by retrieving an operation history database based on the first parameter information, and the operation history database being updated based on the first parameter information and the second parameter information; and
   configuring the first operating environment to provide optimized customized configuration or customized prompt to the specific user based on the customized configuration information or the customized prompt information.

2. The information processing method of claim 1, wherein
   the first parameter information includes name of the first operating environment, name of operation of the first operation and/or commentary information of the first operation for the first operating environment; and
   the second parameter information includes first response information of the first operating environment in response to the first operation.

3. The information processing method of claim 2, wherein
   the first parameter information and the second parameter information are stored in a user operation history database corresponding to the specific user at the remote server for the specific user, and the first parameter information and the second parameter information are managed in the user operation history database,
   wherein the remote server manages the first parameter information and the second parameter information based on association of the first parameter information and the second parameter information with other first parameter information and second parameter information in the user operation history database.

4. The information processing method of claim 3, wherein during the period of generating the customized configuration information related to the specific user, the remote server retrieves parameter information related to the first parameter information in the user operation history database corresponding to the specific user based on the first parameter information, and generates the customized configuration information based on the parameter information related to the first parameter information.

5. The information processing method of claim 2, wherein the first parameter information and the second parameter information are stored and managed in the user operation history database for all users at the remote server, wherein the remote server manages the first parameter information and the second parameter information based on association of the first parameter information and the second parameter information with other first parameter information and second parameter information in the user operation history database.

6. The information processing method of claim 5, wherein during the period of generating the customized prompt information related to the specific user, the remote server receives inquiry information related to the operation of the first operating environment from the terminal apparatus, retrieves parameter information related to the inquiry information in the user operation history database based on the inquiry information, and generate the customized prompt information based on the parameter information related to the inquiry information.

7. The information processing method of claim 1, wherein the first operating environment includes an operation system running in the terminal apparatus or programs running on the operation system.

8. A terminal apparatus comprising:
a communication unit configured to connect and communicate with a remote server;
a storing unit configured to store program data related to a first operating environment; and a processing unit configured to, in a first operating environment, obtain a first operation for the first operating environment of a specific user of the terminal apparatus and respond to the first operation by the first operating environment;
the processing unit transmits first parameter information of the first operation and second parameter information of the first operating environment in response to the first operation to the remote server by the communication unit;
the processing unit receives customized configuration information or customized prompt information related to the specific user from the remote server by the communication unit, wherein the customized configuration information or the customized prompt information is customized configuration information or customized prompt information for the specific user determined by the remote server by retrieving an operation history database based on the first parameter information, and the operation history database being updated based on the first parameter information and the second parameter information; and the processing unit configures the first operating environment to provide optimized customized configuration or customized prompt to the specific user based on the customized configuration information or the customized prompt information.

9. The terminal apparatus of claim 8, wherein
the first parameter information includes name of the first operating environment, name of operation of the first operation and/or commentary information of the first operation for the first operating environment; and
the second parameter information includes first response information of the first operating environment in response to the first operation.

10. The terminal apparatus of claim 9, wherein
the first parameter information and the second parameter information are stored in a user operation history database corresponding to the specific user at the remote server for the specific user, and the first parameter information and the second parameter information are managed in the user operation history database,
wherein the remote server manages the first parameter information and the second parameter information based on association of the first parameter information and the second parameter information with other first parameter information and second parameter information in the user operation history database.

11. The terminal apparatus of claim 10, wherein
during the period of generating the customized configuration information related to the specific user, the remote server retrieves parameter information related to the first parameter information in the user operation history database corresponding to the specific user based on the first parameter information, and generates the customized configuration information based on the parameter information related to the first parameter information.

12. The terminal apparatus of claim 9, wherein
the first parameter information and the second parameter information are stored and managed in the user operation history database for all users at the remote server,
wherein the remote server manages the first parameter information and the second parameter information based on association of the first parameter information and the second parameter information with other first parameter information and second parameter information in the user operation history database.

13. The terminal apparatus of claim 12, wherein
during the period of generating the customized prompt information related to the specific user, the remote server receives inquiry information related to the operation of the first operating environment from the terminal apparatus, retrieves parameter information related to the inquiry information in the user operation history database based on the inquiry information, and generate the customized prompt information based on the parameter information related to the inquiry information.

14. The terminal apparatus of claim 8, wherein
the first operating environment includes an operation system running in the terminal apparatus or programs running on the operation system.

* * * * *